United States Patent
Endo et al.

(10) Patent No.: US 10,019,811 B2
(45) Date of Patent: Jul. 10, 2018

(54) IMAGE PROCESSING APPARATUS AND METHOD FOR ESTIMATING AN ERROR IN REGISTRATION BETWEEN IMAGES

(71) Applicant: CANON KABUSHIKI KAISHA, Tokyo (JP)

(72) Inventors: Takaaki Endo, Urayasu (JP); Kiyohide Satoh, Kawasaki (JP); Ryo Ishikawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 76 days.

(21) Appl. No.: 14/972,559

(22) Filed: Dec. 17, 2015

(65) Prior Publication Data
US 2016/0180527 A1 Jun. 23, 2016

(30) Foreign Application Priority Data
Dec. 22, 2014 (JP) .................................. 2014-259271

(51) Int. Cl.
*G06K 9/46* (2006.01)
*G06T 7/60* (2017.01)
(Continued)

(52) U.S. Cl.
CPC .............. *G06T 7/60* (2013.01); *G06T 3/0081* (2013.01); *G06T 7/33* (2017.01); *G06T 7/35* (2017.01); *G06T 2207/10072* (2013.01)

(58) Field of Classification Search
None
See application file for complete search history.

(56) References Cited

U.S. PATENT DOCUMENTS 5,937,083 A * 8/1999 Ostuni .................. G06T 3/0068
382/131
6,950,494 B2 * 9/2005 Vija ...................... A61B 6/505
378/4
(Continued)

FOREIGN PATENT DOCUMENTS

JP 2013-198722 A 10/2013

OTHER PUBLICATIONS

M. E. Al-Mualla, N. Canagarajah and D. R. Bull, "Error concealment using motion field interpolation," Proceedings 1998 International Conference on Image Processing. ICIP98 (Cat. No. 98CB36269), Chicago, IL, 1998, pp. 512-516 vol. 3.*
(Continued)

*Primary Examiner* — Andrae S Allison
(74) *Attorney, Agent, or Firm* — Carter, DeLuca, Farrell & Schmidt, LLP

(57) ABSTRACT

An image processing apparatus obtains a plurality of corresponding information items for registration of a first image and a second image of an object, calculates, in a case where the first image and the second image are registered using corresponding information items remaining after excluding at least one corresponding information item from the plurality of corresponding information items, a registration error that occurs at a position of the excluded corresponding information item, and estimates a registration error at an arbitrary position in a case where the first image and the second image are registered using the plurality of corresponding information items based on the calculated registration error.

25 Claims, 8 Drawing Sheets

(51) Int. Cl.
*G06T 3/00* (2006.01)
*G06T 7/35* (2017.01)
*G06T 7/33* (2017.01)

(56) References Cited

U.S. PATENT DOCUMENTS

| | | | |
|---|---|---|---|
| 7,526,060 B2* | 4/2009 | Ziegler | G06T 11/006 378/4 |
| 7,593,559 B2* | 9/2009 | Toth | A61B 3/0025 128/922 |
| 8,081,808 B2* | 12/2011 | Huang | A61B 3/0033 351/205 |
| 8,350,222 B2* | 1/2013 | Vija | A61B 6/4241 250/363.05 |
| 8,577,103 B2* | 11/2013 | Vija | G06T 5/50 382/128 |
| 9,053,536 B2 | 6/2015 | Imamura et al. | |
| 2007/0012886 A1* | 1/2007 | Tearney | A61B 10/02 250/459.1 |
| 2007/0216909 A1* | 9/2007 | Everett | A61B 5/0059 356/479 |
| 2011/0044524 A1* | 2/2011 | Wang | G01R 33/54 382/131 |
| 2011/0164801 A1* | 7/2011 | Gagnon | G01R 33/481 382/131 |
| 2012/0300998 A1* | 11/2012 | Ioudovski | A61B 3/0025 382/128 |
| 2012/0326034 A1* | 12/2012 | Sachs | G06T 11/005 250/336.1 |
| 2014/0270443 A1* | 9/2014 | Vija | A61B 6/037 382/131 |
| 2015/0043800 A1 | 2/2015 | Miyasa et al. | |
| 2015/0070385 A1 | 3/2015 | Ishizu et al. | |
| 2015/0235369 A1 | 8/2015 | Ishida et al. | |
| 2016/0125584 A1* | 5/2016 | Suzuki | G06T 11/60 382/131 |

OTHER PUBLICATIONS

Santiago et al, Adjustment of Deformable Models to Organ Sufaces in 3D Images, Signal and Image Processing Group (SIPG), 2011.*
U.S. Appl. No. 14/943,204, filed Nov. 17, 2015, Inventor Ryo Ishikawa et al.
U.S. Appl. No. 15/016,453, filed Feb. 5, 2016, Inventor Ryo Ishikawa et al.
U.S. Appl. No. 14/970,752, filed Dec. 16, 2015, Inventor Takaaki Endo et al.

* cited by examiner

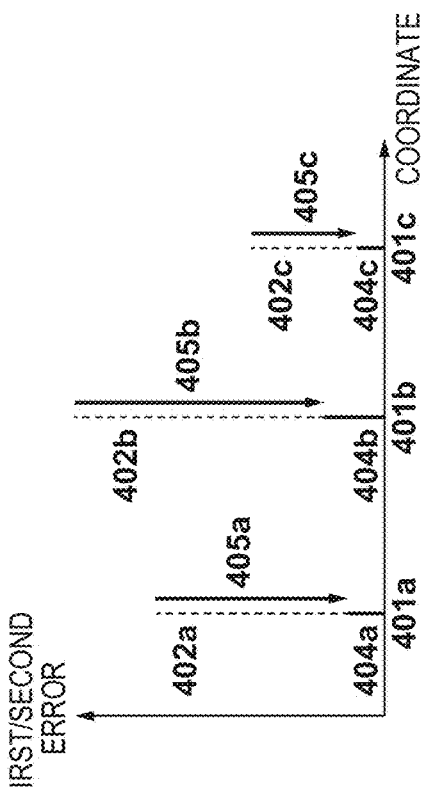
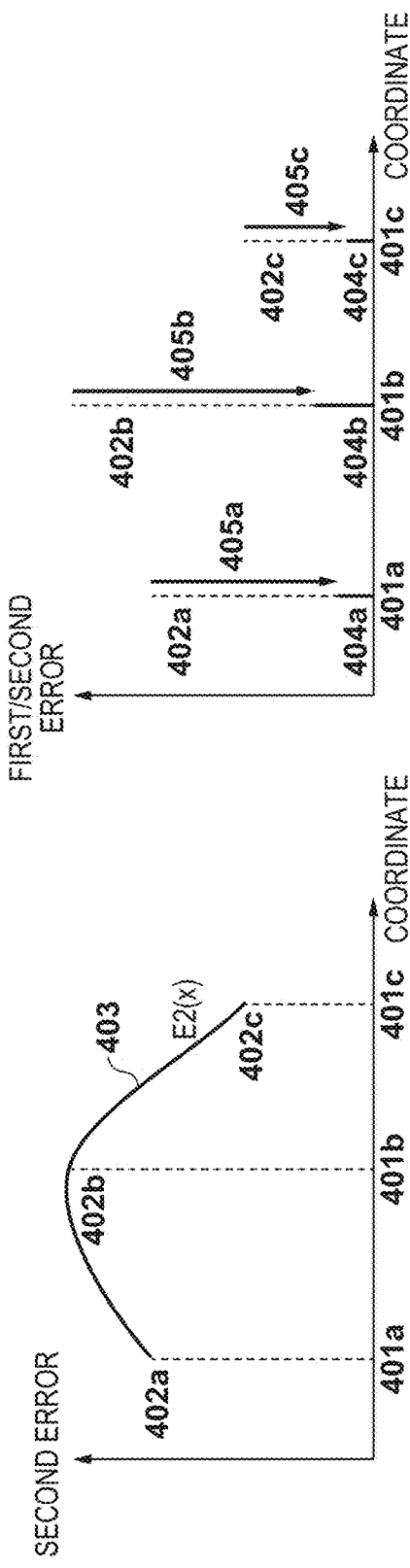
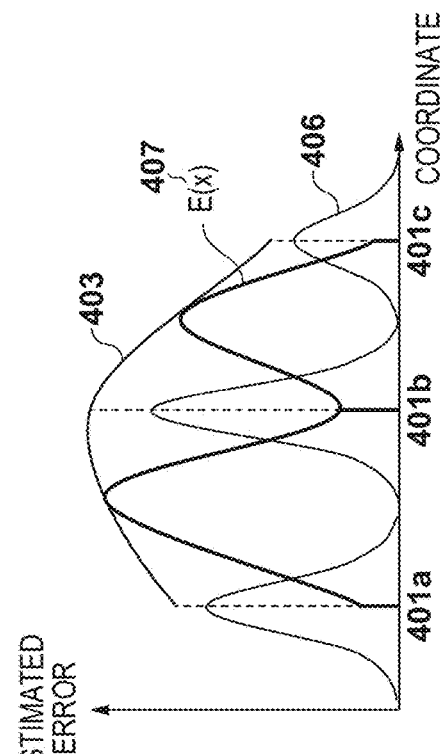
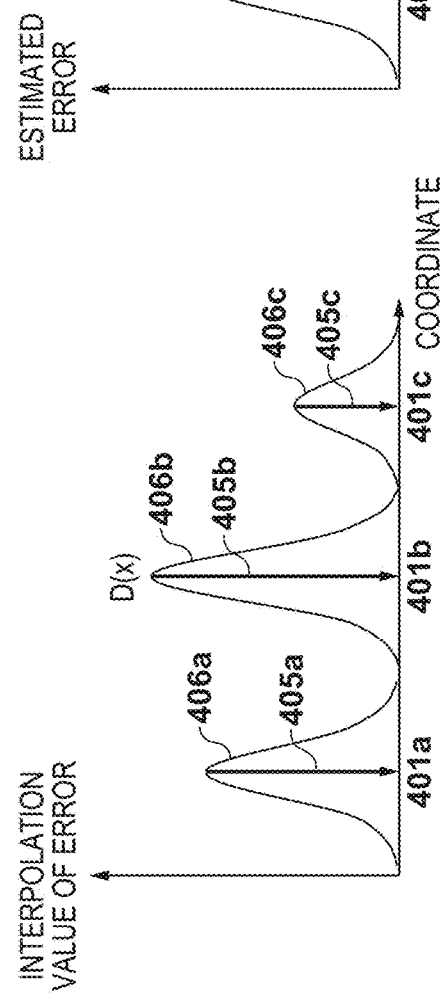

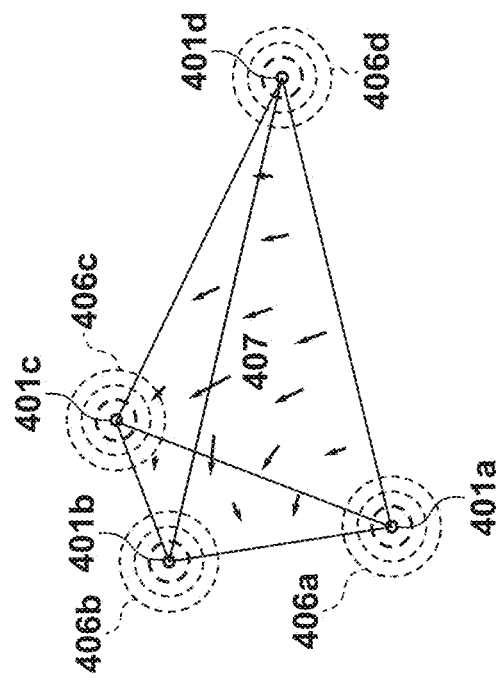
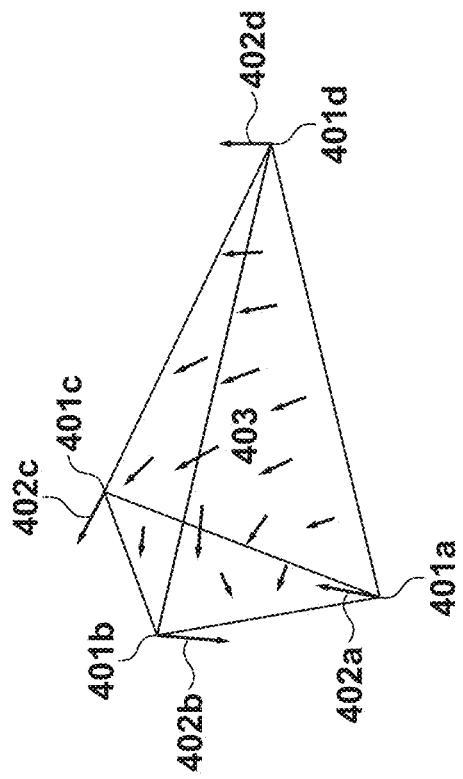

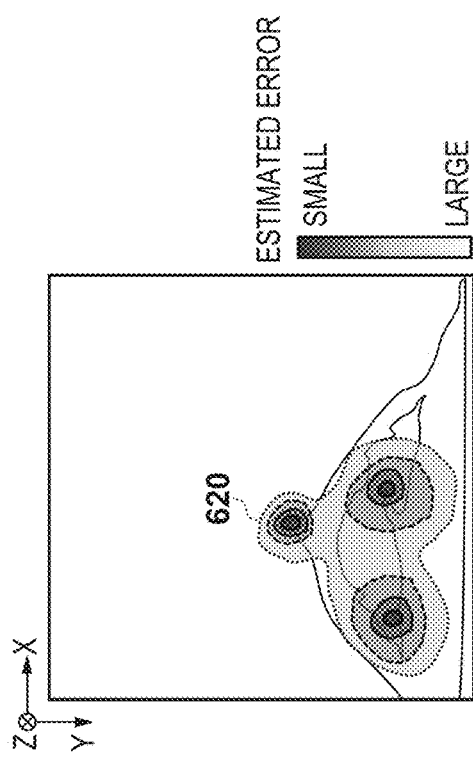
FIG. 6A
FIG. 6B
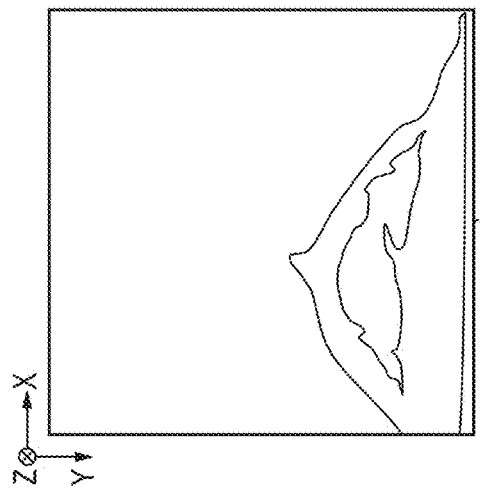
FIG. 7A
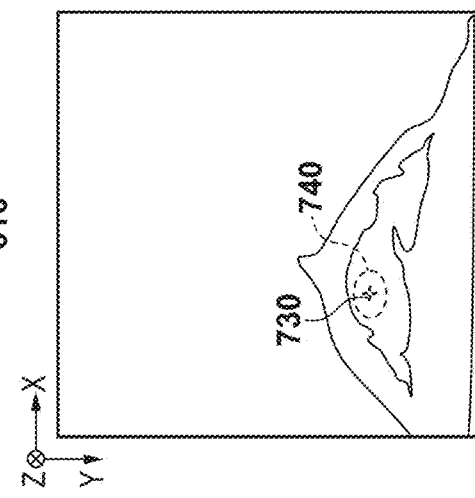
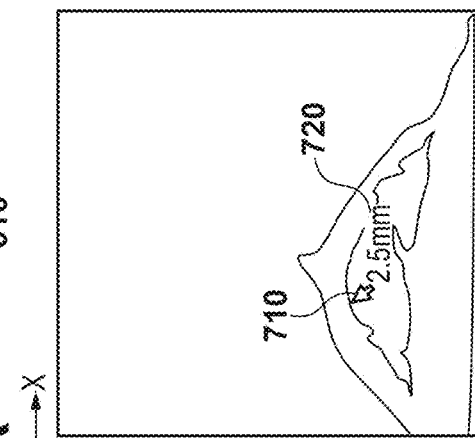
FIG. 7B

IMAGE PROCESSING APPARATUS AND METHOD FOR ESTIMATING AN ERROR IN REGISTRATION BETWEEN IMAGES

BACKGROUND OF THE INVENTION

Field of the Invention

The present invention relates to an image processing apparatus and a method for estimating an error in registration between images.

Description of the Related Art

In an image diagnosis using medical images (three-dimensional tomographic images that represent information within an object), a doctor performs a diagnosis while comparing images captured by a plurality of image capturing apparatuses (modalities), differing positions, times, image capturing parameters, or the like. However, when the posture or the shape of an object differs between images, it is difficult to perform an identification and comparison of a lesion portion between images. Accordingly, by performing a registration between a plurality of images, generation of an image that is made to be the same as another one by applying a deformation or a transformation of a posture in the one image is attempted. Also, it is possible to calculate and present a position of a corresponding point, that corresponds to a point of interest on one image, on another image by performing such a registration. As a result, the doctor can easily perform an identification or comparison of a lesion portion between a plurality of images. There are also cases in which similar work having the objective of inspection an internal state of an object is executed in fields other than medicine.

However, because, in general, the result of registration includes an error, and it is not necessarily accurate, there is a problem in that a doctor cannot determine to what degree the result of the registration may be trusted. With respect to this, Japanese Patent Laid-Open No. 2013-198722 (hereinafter referred to as document 1) discloses a method of estimating an error based on an instability (solution uncertainty) of a deformation parameter estimated as a result of a deformable registration. In the method of document 1, based on a range in which an estimation position of a corresponding point for a point of interest varies when an unstable parameter is caused to vary intentionally, an error in this position is estimated.

However, while it is possible to estimate a random error (solution uncertainty) at an arbitrary position based on the instability of an estimation parameter in the method of estimating error recited in document 1, there is the problem that other factors cannot be considered.

SUMMARY OF THE INVENTION

Embodiments of the present invention are conceived in view of the foregoing problem, and an image processing apparatus that enables more accurate estimation of a registration error at an arbitrary position other than that of a corresponding point is provided thereby.

According to one aspect of the present invention, there is provided an image processing apparatus, comprising: an obtaining unit configured to obtain a plurality of corresponding information items for registration of a first image and a second image of an object; a calculation unit configured to calculate, in a case where the first image and the second image are registered using corresponding information items remaining after excluding at least one corresponding information item from the plurality of corresponding information items, a registration error that occurs at a position of the excluded corresponding information item; and an estimation unit configured to estimate a registration error at an arbitrary position in a case where the first image and the second image are registered using the plurality of corresponding information items based on the registration error calculated by the calculation unit.

According to another aspect of the present invention, there is provided an image processing method, comprising: obtaining a plurality of corresponding information items for registration of a first image and a second image of an object; calculating, in a case where the first image and the second image are registered using corresponding information item remaining after excluding at least one corresponding information item from the plurality of corresponding information items, a registration error that occurs at a position of the excluded corresponding information item; and estimating a registration error at an arbitrary position in a case where the first image and the second image are registered using the plurality of corresponding information items based on the calculated registration error.

Furthermore, according to another aspect of the present invention, there is provided a non-transitory computer readable storage medium storing a program for causing a computer to execute an image processing method comprising: obtaining a plurality of corresponding information items for registration of a first image and a second image of an object; calculating, in a case where the first image and the second image are registered using corresponding information items remaining after excluding at least one corresponding information item from the plurality of corresponding information items, a registration error that occurs at a position of the excluded corresponding information item; and estimating a registration error at an arbitrary position in a case where the first image and the second image are registered using the plurality of corresponding information items based on the calculated registration error.

Further features of the present invention will become apparent from the following description of exemplary embodiments with reference to the attached drawings.

BRIEF DESCRIPTION OF THE DRAWINGS

FIG. 4A to FIG. 4D are views for explaining estimated error calculation processing in the first embodiment.

FIG. 5A and FIG. 5B are pattern diagrams for illustrating examples of estimated error calculated in the first embodiment.

FIG. 6A and FIG. 6B are pattern diagrams for illustrating examples of estimated error display in the first embodiment.

FIG. 7A and FIG. 7B are pattern diagrams for illustrating examples of an estimated error display in a second variation.

DESCRIPTION OF THE EMBODIMENTS

Hereinafter, a detailed explanation of the embodiment of the present invention is given with reference to attached figures. However, the scope of the present invention is not limited to the examples that are shown.

First Embodiment

An image processing apparatus in accordance with the first embodiment performs registration processing (deformable registration) based on corresponding information that corresponds between a plurality of three-dimensional tomographic images, and generates a deformed image for which one three-dimensional tomographic image is caused to deform so as to match a position or a shape of another three-dimensional tomographic image. At that time, the image processing apparatus obtains an estimated error of registration at respective positions in the generated deformed image based on registration processing error, and displays a distribution of these in association with the deformed image. Here, the corresponding information is information of points, lines, surfaces, or the like, corresponding between two images. In the present embodiment, explanation is given for a case in which an error at a point of interest is estimated using as corresponding information a plurality of corresponding points that correspond between three-dimensional tomographic images, but corresponding lines, corresponding surfaces, or the like, can also be used. Below, explanation will be given for an image processing apparatus in accordance with the first embodiment. Note that in the present embodiment, for an estimated error, and an error of registration processing, a vector whose components are made to be errors in respective axial directions is employed.

<1. Configuration of Image Diagnosis System 1>

Figure 1:
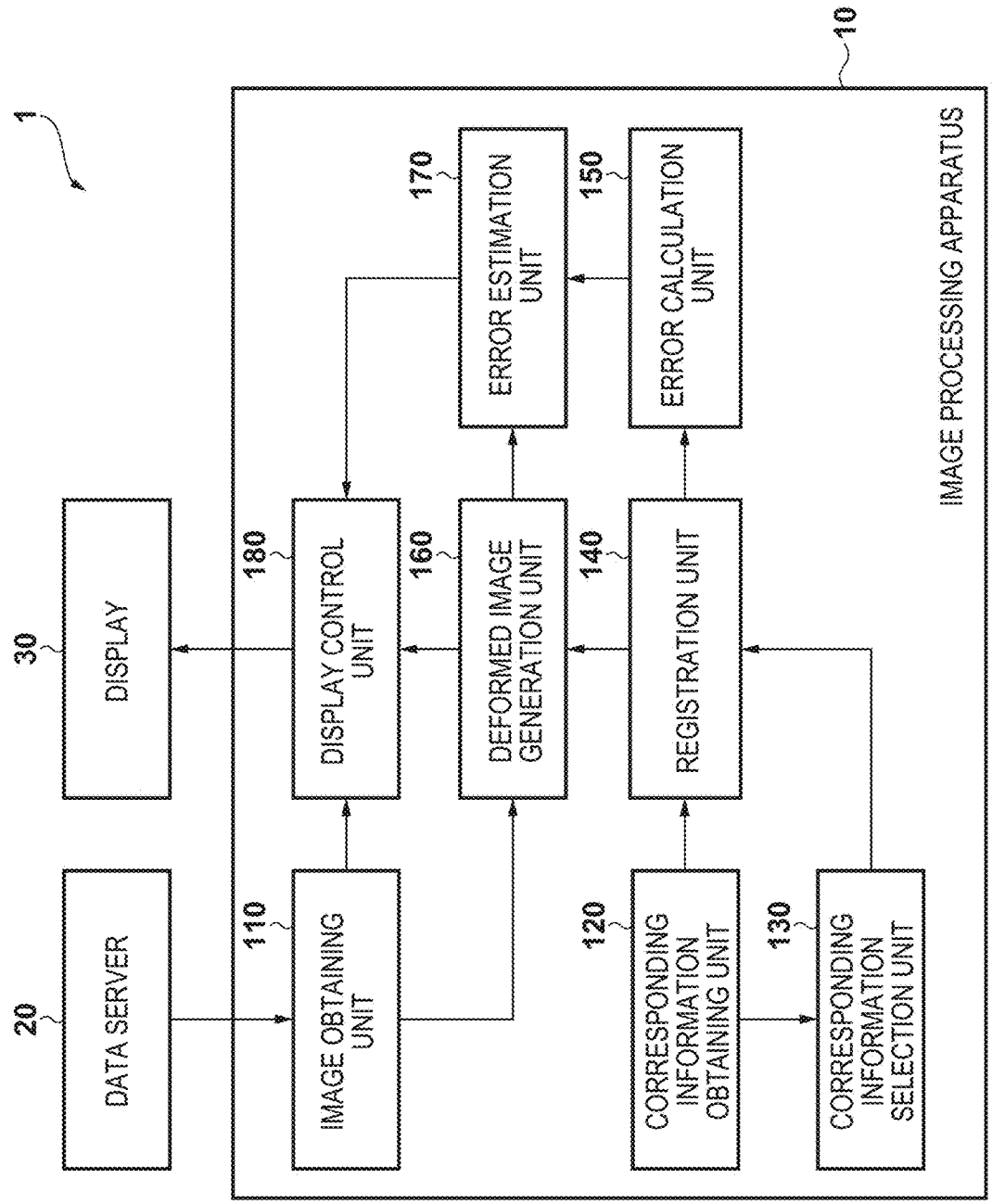
FIG. 1 is a view for illustrating a functional configuration of an image diagnosis system and an image processing apparatus in accordance with a first embodiment.

FIG. 1 illustrates an example configuration of an image diagnosis system 1 according to the present embodiment. As shown in FIG. 1, in the first embodiment, the image diagnosis system 1 comprises an image processing apparatus 10, a data server 20, and a display 30. The image processing apparatus 10 comprises an image obtaining unit 110, a corresponding information obtaining unit 120, a corresponding information selection unit 130, a registration unit 140, an error calculation unit 150, a deformed image generation unit 160, an error estimation unit 170, and a display control unit 180.

The image obtaining unit 110 obtains a plurality of three-dimensional tomographic images of an object which are targets of registration from the data server 20. Below, explanation is given assuming that the three-dimensional tomographic images that are the targets of registration are a first image and a second image. Note that the images that are the targets of registration are not limited to three-dimensional tomographic images, and may be two-dimensional tomographic images.

The corresponding information obtaining unit 120 obtains, as corresponding information that corresponds between images (hereinafter referred to as first corresponding information), information of a plurality of corresponding points in the first image and the second image which are obtained by the image obtaining unit 110. Here, information of respective corresponding points in the first corresponding information is a pair of coordinates that represent the same position (a corresponding location) on an object in the first image and the second image respectively. The corresponding information selection unit 130 selects corresponding points to be targets of error calculation from out of the first corresponding information (a plurality of corresponding points), and selects, as corresponding information (hereinafter referred to as second corresponding information) to be used for later described second registration, corresponding points remaining after excluding these selected corresponding points.

The registration unit 140, based on the first corresponding information obtained by the corresponding information obtaining unit 120, executes deformation estimation processing (first registration processing) for the first image and the second image. Also, the registration unit 140, based on the second corresponding information, executes deformation estimation processing (second registration processing) for the first image and the second image.

The error calculation unit 150, for the result of the first registration processing, calculates residual error vectors of positions at the respective positions of the plurality of corresponding points. Note that these residual error vectors are FRE (Fiducial Registration Error), and in the following explanation this will be referred to as first errors. Also, the error calculation unit 150, for the result of the second registration processing, calculates error vectors at positions for the positions of the corresponding points that the corresponding information selection unit 130 selects (i.e., corresponding points that are not used in the second registration processing). Note that this residual error vector is a TRE (Target Registration Error), and in the following explanation this will be referred to as a second error. Note that in a case where rather than corresponding points, corresponding lines or corresponding surfaces are used, direction vectors for which a distance between lines or surfaces that correspond after registration is a maximum may be made to be the first error and the second error. Here, to calculate the distance between the lines or surfaces, it is possible to use publicly known methods. The deformed image generation unit 160, based on a result of the first registration processing, generates a new three-dimensional image (deformed image) for which a coordinate transformation is applied to the first image so as to match the second image.

The error estimation unit 170, based on the first error and the second error at the respective corresponding point positions that the error calculation unit 150 calculates, calculates an estimated error of registration for each point on the deformed image, and generates an estimated error image indicating a distribution of these. For example, the estimated error image is generated by determining the values of each voxel or each pixel in the deformed image based on estimated arbitrary position registration error. Note that the estimated error image in the present embodiment is a volume image, each voxel value of which indicates an estimated error of registration at its position. Note that if the estimated error image is generated as a two-dimensional image, it is an image whose pixel values each indicate an estimated error of a registration at their positions. The display control unit 180 performs control to display to the display 30 a cross section image of the second image and a cross section image (corresponding cross section image) of the deformed image (a first image after the deformation by the deformed image generation unit 160). Also, the display control unit 180 performs control to display to the display 30 information of an error that the error estimation unit 170 estimated (for example, obtained from the estimated error image) in association with the cross section images.

The data server 20 holds a plurality of three-dimensional tomographic images of the object which are the targets of registration. Note for each three-dimensional tomographic image, corresponding information between images such as image size, resolution, modality type, image capturing information (image capturing parameters, image capturing site, a position, or the like), case information (patient information, examination information, diagnosis information, organ region information, region of interest information, or the like) is included as supplementary information. This supplementary information, as necessary, is sent to the image processing apparatus 10 along with the images. The display 30 performs various display under the control of the image processing apparatus 10 (the display control unit 180). For example, it performs a display of a tomographic image as is later described with reference to FIG. 6A and FIG. 6B.

<2. Processing that Image Processing Apparatus 10 Executes>

Figure 2:
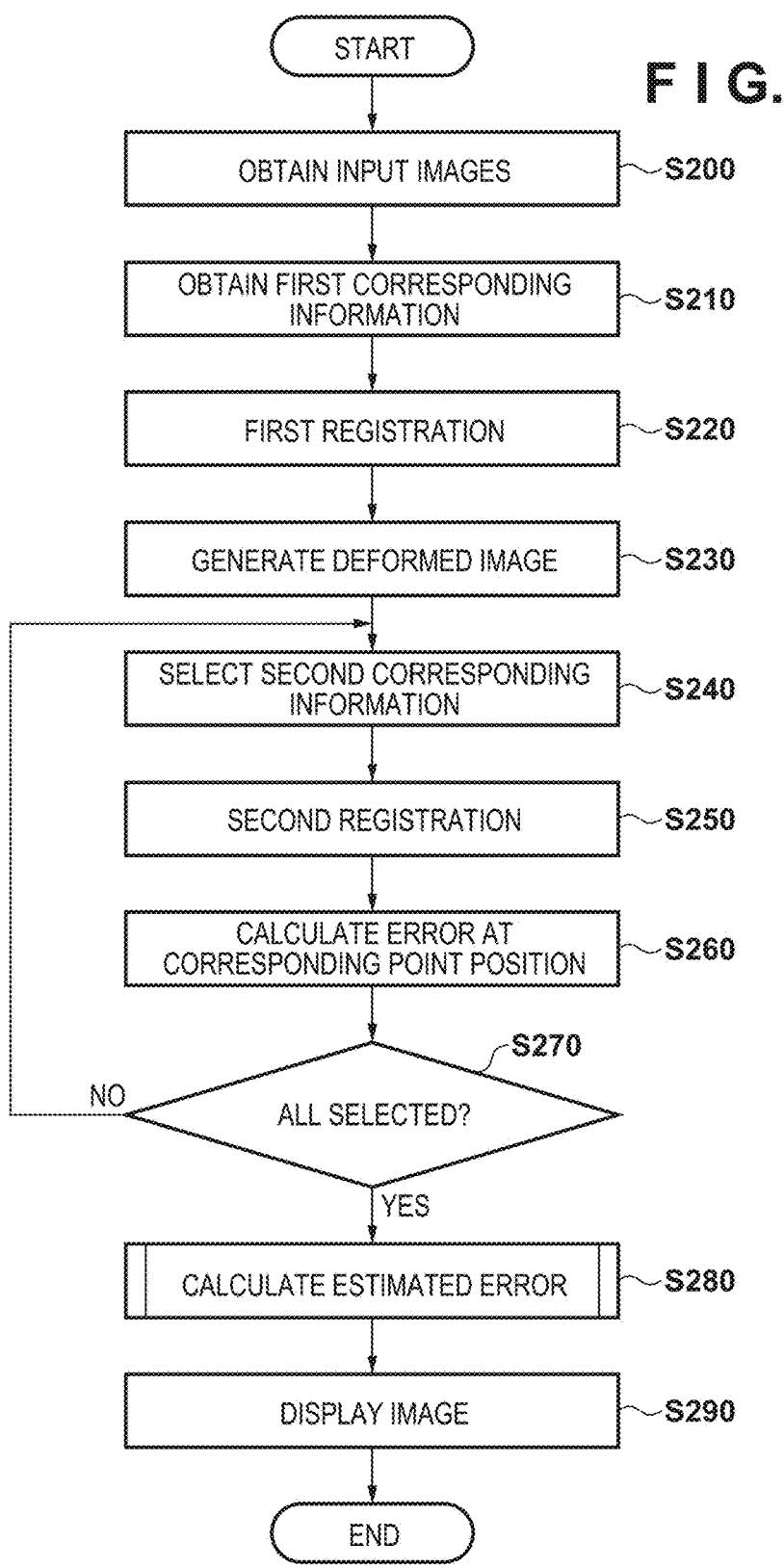
FIG. 2 is a flowchart for illustrating a processing procedure of the image processing apparatus in accordance with the first embodiment.

Next, with reference to the flowchart of FIG. 2, explanation will be given for a processing procedure that the image processing apparatus 10 in accordance with the first embodiment executes. Note that in the following explanation, explanation is given of an example of a case in which two three-dimensional tomographic images in which the same object is captured in differing deformation states are read as the first image and the second image, and by applying deformation processing to the first image, a deformed image caused to deform so as to match a position or shape of the second image is generated.

In the image processing apparatus 10 of the present embodiment, estimation of registration error at arbitrary positions on the registered images is realized by:
  obtaining processing for obtaining a plurality of corresponding information items for registration of the first image and the second image of the object;
  calculation processing for calculating, in a case where the first image and the second image are registered using the corresponding information items remaining after excluding at least one corresponding information item from the foregoing plurality of corresponding information items, a registration error that occurs at a position of the excluded corresponding information item; and
  estimation processing that estimates a registration error at an arbitrary position in a case where the first image and the second image are registered using a plurality of corresponding information items based on the foregoing calculated registration error. Note that the obtainment processing is executed by the corresponding information obtaining unit 120 (step S210). The calculation processing is executed by the corresponding information selection unit 130, the registration unit 140, and the error calculation unit 150 (step S240 to step S270). Also, estimation processing is executed by the error estimation unit 170 (step S280). Below, detailed explanation is given of each step illustrated in the flowchart of FIG. 2.

Firstly, in step S200, the image obtaining unit 110 obtains from the data server 20 a plurality of three-dimensional tomographic images (i.e. the first image and the second image) of the object which are the targets of registration. The image obtaining unit 110 sends the obtained images to the deformed image generation unit 160 and the display control unit 180.

Next, in step S210, the corresponding information obtaining unit 120 obtains the first corresponding information for the first image and the second image, and sends the obtained first corresponding information to the corresponding information selection unit 130 and the registration unit 140. Step S210 is an example of the foregoing obtainment processing. Note that the obtaining of the first corresponding information by the corresponding information obtaining unit 120 is, for example, executed by a user inputting corresponding points between the images that are identified by visual observation into the image processing apparatus 10. In other words, the corresponding information obtaining unit 120:
  causes a cross section image of each three-dimensional tomographic image (the first image and the second image) to be displayed on the display 30 via the display control unit 180;
  a user is allowed to compare the first image and the second image displayed on the display 30, and to input, as corresponding points, positions deemed to be anatomically the same on the respective images by clicking a mouse (not shown); and
  the corresponding points input by the user are obtained as the first corresponding information.

In step S220, the registration unit 140, based on the first corresponding information obtained in step S210, executes the first registration processing (deformation estimation processing) for the first image and the second image. Specifically, the registration unit 140 estimates deformation information (deformation parameters) such that a residual error (or a cost function including the residual error) of corresponding point positions that correspond with the second image becomes a minimum when the first image is deformed. Because such deformation estimation processing is a publicly known technique, detailed explanation thereof is omitted. Next, the registration unit 140 sends the obtained estimation result (hereinafter referred to as referred to as a first registration result) to the error calculation unit 150 and the deformed image generation unit 160.

In step S230, the deformed image generation unit 160 generates a deformed image by registering the first image and the second image using a plurality of corresponding information items. In other words, the deformed image generation unit 160, based on the first registration result obtained in step S220, generates a new three-dimensional image (deformed image) by applying a coordinate transformation to the first image so as to match the second image.

The following step S240 to step S270 are an example of the above described calculation processing. Firstly, in step S240, the corresponding information selection unit 130 from out of the first corresponding information (a plurality of corresponding points) obtained in step S210, selects sequentially (one at a time) corresponding points to become the target of error calculation. Then, a plurality corresponding points (remaining corresponding points) that excludes this corresponding point (performs Leave-one-out) is selected as the second corresponding information.

In step S250, the registration unit 140, based on the second corresponding information selected in step S240, executes the second registration processing (deformation estimation processing) for the first image and the second image. In other words, similarly to the first registration processing in step S220, deformation information (deformation parameters) is estimated so that a residual error (or a cost function including the residual error) for corresponding point positions that correspond with the second image becomes a minimum when the first image is deformed. Then, the obtained estimation result (hereinafter referred to as a second registration result) is sent to the error calculation unit 150. Note that in the present embodiment, the first registration processing (deformation estimation processing) in step S220 and the second registration processing (deformation estimation processing) in step S250 are of the same algorithm, and the corresponding information used (the first corresponding information and the second corresponding information) differs.

In step S260, the error calculation unit 150, for the first registration result (deformation estimation result) obtained in step S220, calculates residual error vectors (FRE) at the position of the corresponding point selected in step S240, and makes this the first error of that corresponding point. Also, the error calculation unit 150, for the second registration result (deformation estimation result) obtained in step S250, calculates an error vector (a TRE) at the position of the corresponding point selected in step S240, and makes that the second error of that corresponding point. Note that the first error and the second error are error vectors whose components are made to be an error in each axial direction component of the image. However, a configuration may be taken in which the size (norm) of the error vector is calculated as the error (a scalar value) of that corresponding point.

In step S270, the corresponding information selection unit 130 makes a determination as to whether or not the corresponding information selection processing terminates. Specifically, it is determined whether or not selection of all corresponding points is finished. If it is determined that selection processing terminates, the corresponding information selection processing is terminated, and the processing is advanced to step S280. Meanwhile, if it is not determined that selection processing terminates, the processing returns to step S240, and the processing of step S240 to step S260 is executed sequentially to calculate the errors of the remaining corresponding points (unselected corresponding point).

Step S280 is an example of the foregoing estimation processing. In step S280, the error estimation unit 170, based on the first error and the second error calculated for each corresponding point in step S260, calculates the estimated error of the registration at each point (arbitrary points) on the deformed image obtained in step S230. Then, the error estimation unit 170 generates an estimated error image that indicates a distribution of the estimated error of these, and sends it to the display control unit 180. Here, the error estimation unit 170 estimates an estimated error of registration at the arbitrary positions as vectors for each axial direction component if an error vector is calculated as an error for each corresponding point in step S260. Then, an estimated error image is generated for each axial direction. Furthermore, a size (norm) of an estimated error is calculated from the estimated error for each axial direction, and an estimated error image that represents the size of the estimated error at each position is generated. Meanwhile, the error estimation unit 170 estimates an estimated error of registration at an arbitrary position as a scalar value if a scalar value (size of the error) is calculated as an error for each corresponding point in step S260. Then, an estimated error image representing the size of the estimated error is generated. The generation of the estimated error image in step S280 is described later using the flowchart of FIG. 3.

In step S290, the display control unit 180, in accordance with the operation of the user, performs control to display to the display 30 a cross section image of the deformed image generated in step S230 and a cross section image of the second image obtained in step S200. Note that the displayed image is a cross section image in which the second image and the deformed image correspond to each other. Also, the display control unit 180, from the estimated error image obtained in step S280, extracts a cross section corresponding to the cross section image of the deformed image and performs control to display to the display 30 as an estimation error map.

Figure 3:
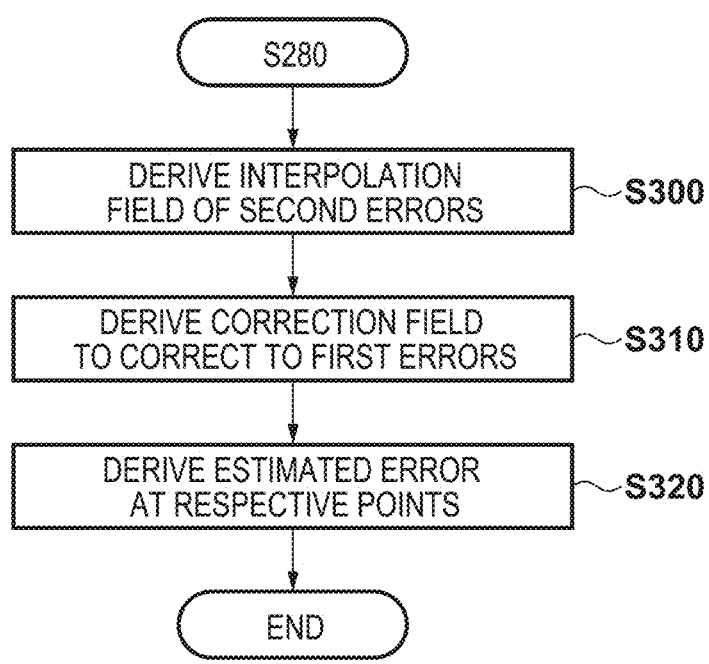
FIG. 3 is a flowchart for illustrating a processing procedure of an error estimation unit 170 in accordance with the first embodiment.

Next, explanation is given of the estimated error calculation processing (estimation processing) in step S280, with reference to the flowchart of FIG. 3. In step S300, the error estimation unit 170, based on the second errors (TRE) at the respective positions of the corresponding points obtained in step S260, derives an interpolation field $E2(x)$ of second errors in order to calculate the value of a second error at an arbitrary position x by interpolating these values. Here, the arbitrary position x is a three-dimensional position or a two-dimensional position. The derivation of the interpolation field $E2(x)$, more specifically, is a derivation of parameters of an interpolation model for interpolating values of errors at positions other than the corresponding points based on the second errors at the positions of the respective corresponding points. A group of functions that arrange a radial basis function at each corresponding point position can be used, for example, as the interpolation model. Note that in the present embodiment, it is assumed that a TPS (Thin Plate Spline) function is used as the radial basis function.

FIG. 4A is a view for illustrating a relation of an interpolation field described by the radial basis function between the corresponding points and the second errors at the positions of each corresponding point. Additionally, in FIG. 4A to FIG. 4D, the description simplifies coordinates and errors to one dimension. In these examples there exist three corresponding points 401 (401a, b, c), and at each point, a second error 402 (402a, b, c) is obtained. Here, the second error at each point in the space is obtained as an interpolation field 403 according to the TPS of the errors 402. Also, FIG. 5A is a pattern diagram representing the corresponding points 401 (401a, b, c, d) in three-dimensional space, and the second errors 402 (402a, b, c, d) at the respective positions of the corresponding points, and their relations to the interpolation field 403.

Here, the error at each corresponding point position that occurs as the result of the first registration processing actually used for generation of the deformed image is the first error (FRE) rather than the second error (TRE). Accordingly, in step S310, the error estimation unit 170, based on a difference between the first error and the second error at a position of each corresponding point obtained in step S260, derives the correction field D(x) to correct the interpolation field $E2(x)$ of the second error obtained in step S300. Specifically, considering correction vectors that correct second errors to first errors so that an error after correction at the position of the respective corresponding point matches the first error, parameters of a correction model that applies error correction values at positions other than those of the corresponding points based on those correction vectors are derived. As the correction model, it is possible to use a model to arrange a radial basis function having compact support at each corresponding point position and to perform a correction that is more similar to that of a corresponding point the closer the position of that corresponding point is (cause correction values to be propagated in accordance with distance). Note that in the present embodiment, it is assumed that a Wendland function is used as the radial basis function.

FIG. 4B is a view for illustrating the corresponding points, the first error and the second error at the position of each corresponding point, and the relations of the correction vectors at those positions. Also, FIG. 4C is a view for illustrating a relationship between correction vectors and a correction field defined by those correction vectors. FIG. 4B illustrates a situation in which in a case where second errors 402 (402*a, b, c*) and first errors 404 (404*a, b, c*) are obtained relating to each of three corresponding points 401 (401*a, b, c*), and respective correction vectors 405 (405*a, b, c*) are defined. Here, as is illustrated in FIG. 4C, in accordance with a radial basis function placed at respective corresponding point positions, correction fields 406 (406*a, b, c*) are defined to cause correction values based on the respective correction vectors to be propagated while damping in neighborhood regions.

Next, in step S320, the error estimation unit 170, using the interpolation field E2(x) of the second error obtained in step S300 and the correction field D(x) obtained in step S310, calculates an estimated error at a predetermined voxel position on the deformed image. More specifically, it defines a function for calculating the estimated error at an arbitrary coordinate x to be E(x)=E2(x)–D(x), where the value (vector) of E(x) is made to be the estimated error at the coordinate x. By executing the foregoing processing on predetermined voxels on the deformed image, an estimated error image is generated.

As described above, in the estimation processing of the present embodiment, by interpolating the calculated registration error (second error) of each corresponding information item, an interpolation field (E2(x)) indicating an interpolated registration error is generated. Then, by a correction field (D(x)) for which the amount of correction at each corresponding information position is a local maximum value, and the amount of the correction reduces in accordance with the distance from the corresponding information position, the interpolation field is corrected (E(x)=E2(x)–D(x)). Then, a registration error estimated at an arbitrary position from the corrected interpolation field (E(x)) is obtained. Configuration may be taken such that the interpolation field is corrected so that the registration error is a local minimum value at each corresponding information position, and the registration error estimated at an arbitrary position is obtained from the corrected interpolation field.

Also, in the embodiment described above, configuration is such that the interpolation field is corrected so that a registration error at a position of each corresponding information item in the interpolation field matches a registration error that remains at a position of each corresponding information item in a case where the first image and the second image are registered using the plurality of corresponding information items (FIG. 4B, FIG. 4C). However, the correction of the interpolation field is not limited to this. If the registration error that occurs at each corresponding information position due to the first registration is very small as compared to the registration error that occurs at each corresponding information position due to the second registration, configuration may be taken so as correct the interpolation field so that the registration error at each corresponding information position becomes zero. This is equivalent to setting the first errors 404*a* to 404*c* to zero in FIG. 4B.

Note that the region over which the estimated error is calculated may be the entirety of the deformed image (all voxels), or may be a region of interest such as an organ region, a lesion that is focused upon. A region of interest such as an organ region or a lesion that is focused upon may be obtained by obtaining information of an organ region or a region of interest in the image obtained in step S200, for example, from the data server 20. Alternatively, configuration may be taken such that to extract from the image the organ region, the lesion region, or the like, using image threshold processing, or a conventional region extraction method. Alternatively, configuration may be taken such that a region on the image that a user designated is obtained as the region of interest. Then, points within in a region of interest such as an organ region or a lesion that is focused upon are set as points of interest, and an estimated error is obtained for each point of interest. With such a configuration, unnecessary calculation can be omitted for subsequent stage processing. Also, the points of interest may be all voxels within a region, or may be those falling at fixed intervals (for example, every 5 voxels). In this way, it is possible to reduce an estimated error calculation time by reducing the calculation target voxels.

FIG. 4D is a view for illustrating a relation of an estimation error 407 between the interpolation field 403 for the second error as illustrated in FIG. 4A and correction fields 406 for correction to the first error as illustrated in FIG. 4C. As illustrated in FIG. 4D, the estimation error 407 at a position of a corresponding point is a value that is equal to the first error at that position, and is a value that approaches the second error interpolation value as it separates from the corresponding point. Also, FIG. 5B is a pattern diagram representing a relationship between the corresponding points 401 (401*a, b, c, d*) in three-dimensional space, the error correction fields 406 (406*a, b, c, d*) distributed centering on the respective positions of the corresponding points, and the distribution of the estimation error 407 corrected thereby. As described above, the processing of step S280 is executed by the error estimation unit 170.

Next, explanation will be given for display of the estimation error map by the display control unit 180 in step S290. The display control unit 180 displays to the display 30, which is a display unit, superimposing the registration error estimated by the estimation processing (step S280) on a cross section image of the deformed image. Hereinafter, a concrete example is illustrated for this superimposition display.

In FIG. 6A, an example of a cross section image 610 of the deformed image displayed on the display 30 is illustrated. Also, in FIG. 6B an example of a display of an estimation error map displayed on the display 30 is illustrated. In this example, an estimation error map 620 is displayed in a form in which it is superimposed on the cross section image 610 of the deformed image. The estimation error map 620 displayed here is a cross section image that cuts, in a cross section corresponding to the cross section image 610 of the deformed image, any of the estimated error image obtained in step S280 (volume data). Luminance values of the image are values into which the voxel values of the estimation error map are transformed. For example, by transforming a predetermined estimated error (for example, estimated error=10 mm) to luminance value=255, and transforming estimated error=0 mm to luminance value=0, a grayscale estimation error map is generated, pseudo-colors are assigned thereto, and this is displayed as a pseudo-color map. Note that it is desirable that a user can set the range of these values.

Additionally, the estimation error map may be displayed to be superimposed on the cross section image of the deformed image as in FIG. 6B, or may be displayed to line up with the cross section image of the deformed image. Also, configuration may be taken such that a user can operate the turning on and turning off of superimposition display. For example, configuration may be taken to provide a superimposition display button on a GUI (not shown) displayed on the display 30, and to control the turning on and turning off of the superimposition display by a user turning on and turning off this button. In such a case, when the superimposition display button is off, the estimation error map is non-displayed and only the cross section image 610 is displayed, and when the superimposition display button is on, the estimation error map 620 is superimposed on the cross section image 610.

Also, if an estimated error for each axial direction is obtained in step S280, configuration may be taken so as to display lining up respective estimation error maps, or configuration may be taken such that it is possible to select which axial direction estimation error map to display. Alternatively, configuration may be taken so that a display of a size (norm) of the estimated error can be selected.

Furthermore, configuration may be taken such that if a corresponding point exists on the cross section image 610 (or in a neighborhood thereof), a value of the first error (FRE) and/or the second error (TRE) is displayed at a neighborhood position of respective corresponding point. At this time, a point on the cross section image that a user instructs by a cursor, or the like, may be made to be a voxel of interest, and it is possible to display an error only for a corresponding point of a neighborhood thereof. Also, the position at which to display the error is not limited to a neighborhood position of a corresponding point, and display in a list format, for example, may be performed at a predetermined position such as to the side or above the display screen.

Note that configuration may be taken such that the estimation error map that the display control unit 180 displays in step S280 is something for which predetermined processing is applied to an estimated error image. For example configuration may be taken such that, by a semi-transparent superimposition display in red, or the like, only on voxels for which the estimated error is greater than or equal to a threshold, it is possible to more clearly confirm a site at which accuracy of the registration is insufficient. Also, configuration may be taken such that a user can select what kind processing-applied estimation error map to superimpose.

As explained above, by virtue of the first embodiment, it is possible to obtain an estimated error of a deformable registration at an arbitrary position on a deformed image at which a corresponding point is not set. Because an estimation error map is superimposed on a cross section image of the deformed image, a user can understand easily to what degree there is a possibility that each point of the displayed cross section image is actually misaligned from its position.

(First Variation)

In the first embodiment, explanation was given for an example in which the interpolation field of the second error is expressed by a radial basis function, but the expression of the interpolation field is not limited to this. For example, the interpolation field may be obtained by a linear interpolation of the second error at the respective corresponding point positions, and interpolation may be performed by approximation in accordance with other functions. Also, configuration may be taken to obtain a displacement field using some method that treats the second error at each corresponding point position as a displacement at the respective position and obtains the entirety of a displacement field based on these displacements (estimates deformation), and to use the obtained displacement field as the interpolation field. For example, it is possible to use an FFD (Free-Form Deformation), which is a publicly known deformation expression method. More specifically, it is possible to express an interpolation field by setting FFD control points to be evenly spaced grid points, and calculating FFD parameters (a control amount that each control point has) based on the second error at the respective positions of the corresponding points.

(Second Variation)

In the first embodiment, explanation was given for an example in which an estimation error map that visualizes a distribution of estimated error is superimposed on a cross section image of the deformed image, but limitation is not made to this, and a display of the estimated error may be performed in a form other than a map.

For example, in step S290, the display control unit 180 displays to the display 30 a cross section image of the second image and a corresponding cross section image of the deformed image generated in step S230 in accordance with operation by a user. Then, the display control unit 180 performs control to obtain an estimated error at a point that the user instructed on the cross section image of the deformed image from the estimated error image obtained in step S280, and perform control to display that to the display 30. Here, it may be that only the estimated error at the point that the user designated is obtained in place of obtaining the estimated error image in step S280. In such a case, the estimated error image generation processing in step S280 becomes unnecessary (explained in detail in a third variation).

FIGS. 7A and 7B illustrate examples of an estimated error display in a second variation. The display control unit 180, when a position designated by a mouse, or the like, of coordinates on the cross section image 610 of the deformed image displayed on the display 30 is obtained, an estimated error at those coordinates is obtained from the estimated error image. Then, as is illustrated in FIG. 7A, for example, for coordinates that a cursor 710 indicates (a position designated on the display), character information 720 representing a size of an estimated error at the coordinates by a numerical value is superimposed in a neighborhood of the cursor 710.

Alternatively, configuration may be taken so as to display a graphic of a size corresponding to the size of the estimated error at the designated position. An example of such a display of a graphic is illustrated in FIG. 7B. In FIG. 7B, for the coordinates indicated by a cursor 730, an ellipse indicating a distribution (an error estimation range) 740 is superimposed on a cross section image of the estimated error at the coordinates. Here, the display control unit 180 renders the ellipse making the coordinates its center and using the sizes of an estimated error in an X axis (the abscissa axis of the cross section image) direction and an estimated error in a Y axis (the ordinate axis of the cross section image) direction for the coordinates indicated by the cursor 730 as the major axis or the minor axis. With this, it is possible for a user to know the estimated value of the error at the coordinates simply be causing the cursor to move over the displayed cross section image 610. In particular, by displaying an ellipse as in FIG. 7B, a user can understand which direction an error is large in, and can understand easily where to add a corresponding point in order to cause the precision of the deformed image to improve.

In this way, in the present variation, at coordinates indicated by the cursor, character information representing an estimated error or an error estimation range is displayed on a cross section image of the deformed image. However, the method of obtaining the deformation information and the method of obtaining the estimated error here are not limited to the methods explained in the first embodiment, and various methods may be used. It is sufficient that a user can understand by the deformed image and the estimated error being displayed in association, to what extent each point on the displayed cross section image is shifted from its position. By virtue of the foregoing second variation, it becomes possible to present an estimated error or reliability of the deformation by a display approach other than a map, and it is possible to avoid a situation in which the cross section image becomes difficult to see due to the superimposition of the error estimation map, or the like.

(Third Variation)

As described above, in the processing of step S280, it is not necessarily essential to generate an estimated error image as a volume image. In place of this configuration may be taken to, in step S290, perform the obtainment of the estimated error similarly to in step S280 for only the voxels on a cross section image of the deformed image for which it is determined that display is performed, and directly generate a cross section image of the estimated error that is displayed. Also, configuration may be taken such that when the display of the second variation is performed, after the coordinates of interest are designated by a cursor, or the like, in the processing of step S290, the estimated error of the coordinates is estimated as appropriate (on-demand) by processing similar to that of step S280.

(Fourth Variation)

In the processing of step S210, the obtainment of the first corresponding information that the corresponding information obtaining unit 120 executes may be performed automatically by image analysis processing. For example, configuration may be taken such that characteristic points or lines of an image pattern are detected from respective images, and the obtainment is performed automatically based on image pattern similarities. Also, corresponding points obtained automatically by image analysis processing may be made to be candidates, and points that a user manually corrected may be made to be final corresponding point positions. Note that the obtainment of first corresponding information, in a case where the data server 20 holds corresponding information that corresponds between images as supplementary information of the images, may be performed by reading that information.

(Fifth Variation)

The processing for an image display in step S290 illustrated in the first embodiment and the second variation is not necessarily essential. In its place, a deformed image obtained in step S230 and an estimated error image obtained in step S280 may be saved in the data server 20, or the like, and the processing of the image processing apparatus 10 may be terminated. In such a case, by the image display apparatus that performs image display processing similar to that of step S290 obtaining the deformed image and error estimation values (estimated error image) thereof from the data server 20, and displaying them, the user can observe the estimated error at an arbitrary position. Also, observation of the deformed image and the estimated error image may be performed by a normal medical image viewer that displays a three-dimensional tomographic image. Note that if an image display is not performed and the first corresponding information is obtained from the data server 20, processing for obtaining the first image and the second image can be omitted.

(Sixth Variation)

In the processing of step S280, when calculating the estimated error of registration at each point on the deformed image, a correction based on prior knowledge related to deformation may be performed. For example, configuration may be taken so as to correct, based on a difference in distance from a specific site to a respective corresponding information position in the first image and the second image, the second registration error calculated by calculation processing. As an example of such a correction, in a case where the object is a breast, it is possible to use a model in which prior knowledge is that regardless of the position, the distance from the papilla to a corresponding point in the breast does not change much. In such a case, for example, based on a degree of mismatch in two distances between the papilla and a corresponding point in respective images, which is obtained for each corresponding point, a correction of the second error is performed at each corresponding point position. More specifically, a ratio of the 2 distances may be calculated setting the smaller of the 2 distances as the denominator, and that value may be multiplied with the second error at a respective corresponding point position. With this, an improvement in the precision of the calculation of the estimated error is expected because the estimated error is corrected to become larger to the extent that there is deviation from the model, which is that regardless of the position, the distance between the papilla and the corresponding point does not change much.

Additionally, as prior knowledge, it is possible to use a level of difficulty in a deformation estimation for each region. In other words, the second registration error calculated by the calculation processing is corrected based on a level of difficulty of the deformation estimation set for regions of the object under which corresponding information items respectively fall. For example, if the object is a breast, the level of difficulty of the deformation estimation at each region of the breast (for example, each of regions A to E as defined in a stipulation for treatment of breast cancer) is expressed by a coefficient of 1 or greater. Then, in accordance with the region in the breast under which respective corresponding points fall, the coefficient may be multiplied with the second error at the respective corresponding point position. For example, the level of difficulty of a region C and a region D, for which a deformation estimation is difficult because deformation of the object due to a change of position, or the like, is large may be set to 1.5, and the level of difficulty of a region A and a region B, for which a deformation of the object due to a change of position, or the like, is small may be set to 1. With this, the estimated error is corrected to be larger for regions for which deformation estimation is difficult than for regions for which deformation estimation is easy, and so an improvement in precision of calculation of estimated error is expected.

Alternatively, the properties of a lesion (hardness, or the like), may be used as the prior knowledge. In such a case, a ratio of a hardness of a lesion with respect to a hardness of a peripheral organization and a reciprocal of the distance to the lesion from a respective corresponding point may be multiplied with the second error at the respective corresponding point position. Accordingly, an improvement in the precision of the calculation of the estimated error is expected in a case where the harder a lesion is than a peripheral organization, the larger the deformation estimation error becomes.

Second Embodiment

In the first embodiment, the interpolation field and the correction field are generated from the second error at each corresponding point, and based on these, the error at an arbitrary point is estimated. In the image processing apparatus in accordance with the second embodiment, based on the second error, a relation between a distance from a corresponding point and the error is obtained, and based on this relationship the estimated error is obtained. Below, explanation will be given mainly of portions that are different to those of the first embodiment for the image processing apparatus in accordance with the second embodiment. Note that in the second embodiment, for the first error, the second error, and the estimated error, their (scalar) size is used rather than vectors.

The configuration of the image diagnosis system 1 in the second embodiment, the operation of each unit of the image processing apparatus 10, and the processing procedure are approximately the same as in the first embodiment. However, the method of calculating the estimated error in step S280 (the method of obtaining the estimated error at the voxel of interest) is different to that of the first embodiment. In the image processing apparatus 10 of the second embodiment, the error estimation unit 170:

calculates, for each corresponding information item, based on the calculated second registration error, an error increase rate that represents an increase of a registration error in accordance with a distance from the position of the corresponding information; and estimates a registration error at an arbitrary position based on a distance from a position of corresponding information and an error increase rate.

Figure 8A:
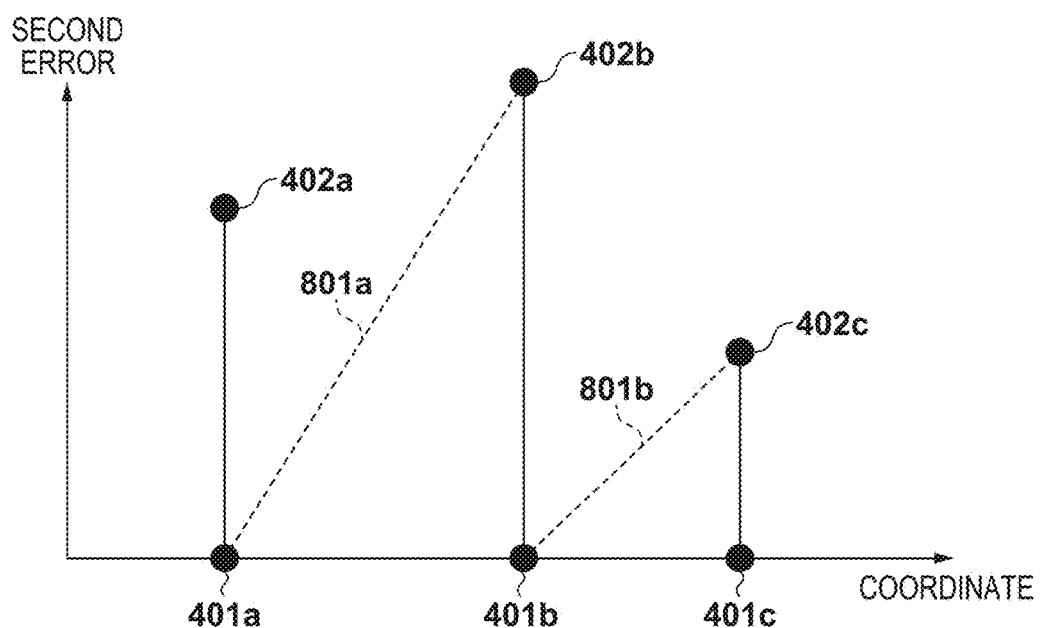
FIG. 8A and FIG. 8B are views for explaining estimated error calculation processing in a second embodiment.
Figure 8B:
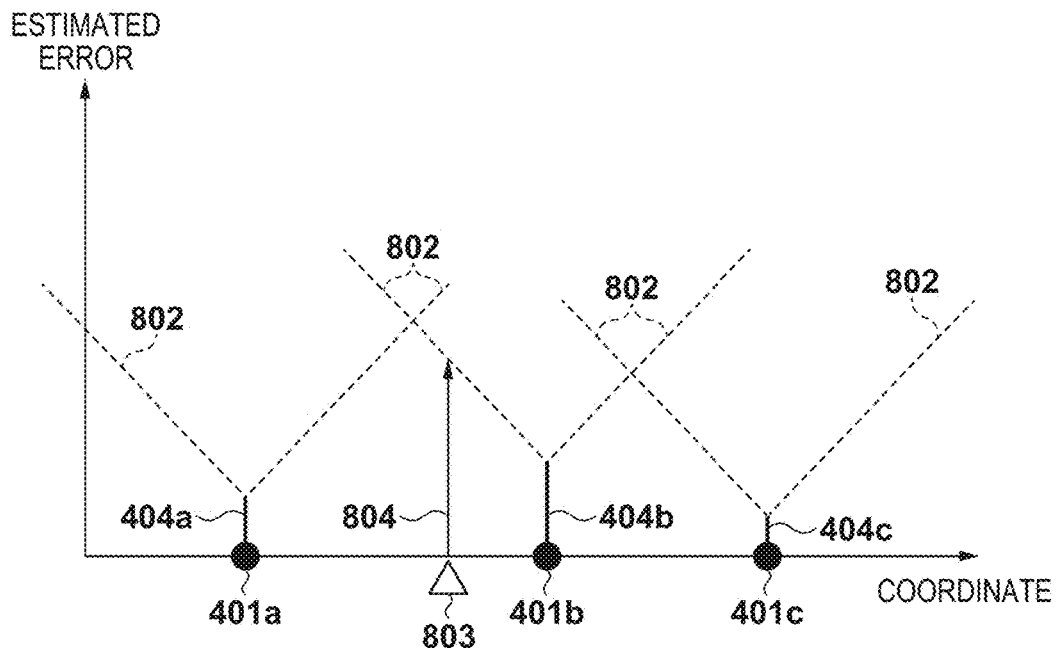

Below, explanation is given with reference to FIGS. 8A, 8B for processing of the error estimation unit 170 in step S280. In particular, in the present embodiment, for each of a plurality of corresponding information items, from the distance to the a nearest neighbor corresponding information item of each corresponding information item, and the registration error calculated for the nearest neighbor corresponding information, an error increase rate of each corresponding information item is obtained. Then, a representative error increase rate is obtained by statistical processing of the plurality of error increase rates that are obtained, and from the distance from the closest corresponding information item to an arbitrary position, and the representative error increase rate, the registration error at the arbitrary position is estimated. Below, explanation is given more specifically.

Firstly, the error estimation unit 170, based on the second error at respective corresponding point positions obtained in step S260, generates an error model in accordance with the distances from the corresponding points 401 (401a, b, c). In the second embodiment, error increase rates 801 (801a, b) at the respective corresponding points are obtained, and a representative error increase rate 802 is obtained by statistical processing of the error increase rates of all of the corresponding points. Then, as shown in FIG. 8B, an error model is generated in which error increases by this proportion (the representative error increase rate) in accordance with the distances from the corresponding points. For example, an average value (average error increase rate) of the error increase rates 801 (801a, b) at the respective corresponding point positions is made to be the representative error increase rate 802.

Figure 9:
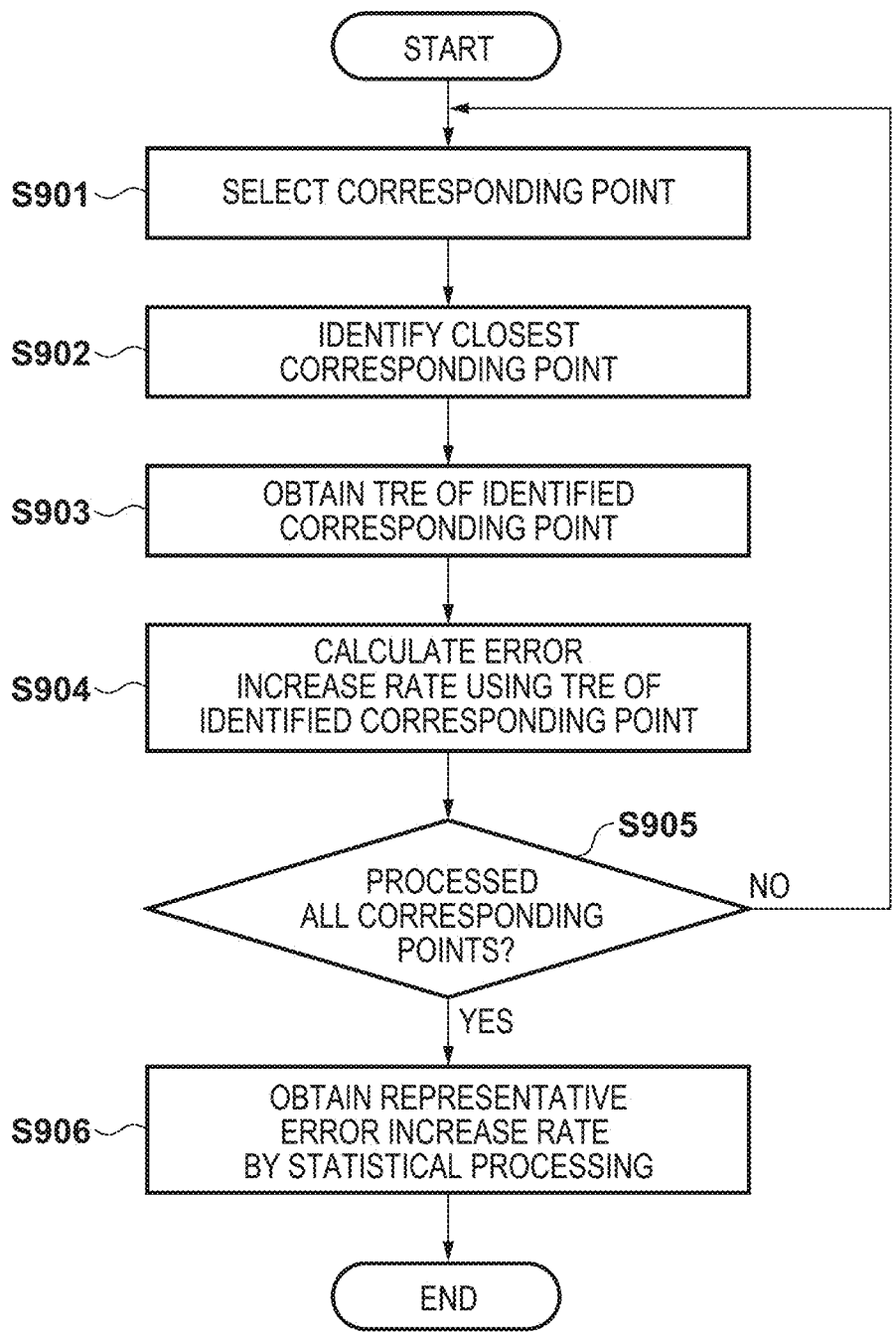
FIG. 9 is a flowchart for illustrating processing for obtaining a representative error increase rate in the second embodiment.

Here, the representative increase rate is obtained by the procedure illustrated by the flowchart of FIG. 9, for example. Firstly, the error increase rate at each corresponding point is obtained by step S901 to step S905. Specifically, the error estimation unit 170 selects one of the plurality of corresponding points (step S901), and identifies the closest corresponding point (nearest neighbor corresponding point) for the selected corresponding point (step S902). The error estimation unit 170 obtains the second error (TRE) at the position of the nearest neighbor corresponding point identified in step S902 (step S903). Then, the error estimation unit 170 obtains the error increase rate of the selected corresponding point by dividing the second error obtained in step S903 by the distance from the selected corresponding point to the identified corresponding point. In FIG. 8A, the nearest neighbor corresponding point of the corresponding point 401a is the corresponding point 401b, and the nearest neighbor corresponding point of the corresponding point 401b is the corresponding point 401c. The values of dividing the values of the errors by the distances from the corresponding points to the nearest neighbor corresponding points are assumed to be error increase rates 801a, 801b for those corresponding points. The foregoing processing of step S901 to step S904 is executed for all of the corresponding points, and when the error increase rates for all of the corresponding points is obtained, the processing proceeds to step S906 (step S905). In step S906, the error estimation unit 170 obtains the representative error increase rate by statistical processing (for example, calculation of an average value) of the error increase rates of all the corresponding points that are obtained.

Next, based on the foregoing error model that was generated, the error estimation value at the voxel of interest is calculated. More specifically, the corresponding point closest to the position of a voxel of interest is identified, and based on the distance to that corresponding point and the error model, the error estimation value at the voxel of interest is calculated. In other words, the value of multiplying the representative error increase rate with the distance is made to be the estimated error at the voxel of interest. For example, in FIG. 8B, the estimated error of a position 803 which is a point of interest is obtained by adding the product of the distance from the corresponding point 401b which is closest to the position 803 and the foregoing representative error increase rate to the first error 404b at the corresponding point 401b. Alternatively, the products of the respective distances from a predetermined number of neighboring corresponding points existing in the neighborhood of the position 803 and the foregoing representative error increase rate may each be added to the first error 404b at the corresponding point 401b, and the value that is the minimum of these may be made to be the estimated error.

Note that the foregoing representative error increase rate is not limited to the average value of the error increase rates of the respective corresponding points, and may be obtained by another method. For example, in place of the average value, a median value of the error increase rate may be used. Also, the error model may be obtained by a method other than one that uses a representative error increase rate. For example, configuration may be taken such that a relationship between a distance to the nearest neighbor corresponding point obtained for a respective corresponding point and the second error at the nearest neighbor corresponding point (relationship between distance and error) is approximated by an arbitrary distance function (for example, a second order function), and that function is made to be the error model. In such a case, the error estimation value at the voxel of interest is calculated by substituting the distance from that voxel to the nearest neighbor corresponding point into the function. In other words, the foregoing embodiment, in which the representative error increase rate is multiplied with the distance, corresponds to the case where a first order function for distance is used as this function.

Also, the method of generating the error model is not limited to a method of using only the nearest neighbor corresponding point for respective corresponding points, and other methods that use neighboring corresponding points may be used. For example, configuration may be taken such that similarly to is explained above, a local representative error increase rate is obtained by obtaining the relationship between error and distance for each of a predetermined number of neighboring corresponding points existing in a neighborhood of an arbitrary position at which the error is to be estimated. For example, for an arbitrary position at which the error is to be estimated, a predetermined number of corresponding information items in a neighborhood of the arbitrary position are selected (for example, a predetermined number corresponding information items are selected in order from the closest to the arbitrary position). Then, for each of the selected predetermined number of corresponding information items, each corresponding information error increase rate is obtained from the distance of the corresponding information item to the nearest neighbor corresponding information item and the second registration error of that nearest neighbor, and a local representative error increase rate is obtained by statistical processing of these error increase rates. Then, from the distance from the closest corresponding information item to the arbitrary position and the local representative error increase rate, the registration error at the arbitrary position is estimated. As described above, the registration error at the arbitrary position is estimated based on the distance of the arbitrary position from neighboring corresponding information and a representative error increase rate, or the distance from corresponding information in a neighborhood of the arbitrary position and a local representative error increase rate, or the like.

As explained above, by virtue of the second embodiment, it becomes possible to obtain an estimated error based on a relationship between the distance from the corresponding point and the error. Accordingly, there is the effect that it is possible to calculate the estimated error by simple processing. Also, if a local representative error increase rate is used, estimation of a registration error that corresponds more to the content of the images becomes possible.

The present invention can be realized by supplying a program for realizing one or more functions of the above described embodiments to a system or an apparatus via a network or a storage medium, and by one or more processors in a computer of the system or apparatus reading and executing the program. Also, it can be realized by a circuit (for example, an ASIC) that realizes one or more functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-259271, filed Dec. 22, 2014, which is hereby incorporated by reference herein in its entirety.

What is claimed is:

1. An image processing apparatus, comprising:
one or more processors; and
at least one memory coupled to the one or more processors, the at least one memory having instructions stored thereon which, when executed by the one or more processors, cause the one or more processors to:
obtain a plurality of corresponding information items of a first image and a second image of an object;
calculate, registration errors that occur at positions defined by the plurality of corresponding information items of the first image and the second image that are registered based on the plurality of corresponding information items;
estimate, on the basis of the registration errors at the positions, a registration error that occurs at a further position different from the positions; and
estimate the registration error at the further position on the basis of a distance between the further position and a position of corresponding information item and an error increase rate of the registration error in accordance with a distance from the position of corresponding information item.

2. The apparatus according to claim 1, wherein the instructions, when executed by the one or more processors, cause the one or more processors further to:
obtain, for each of a plurality of corresponding information items, an error increase rate of the respective corresponding information item on the basis of a distance to nearest neighbor corresponding information item of the respective corresponding information item, and a registration error calculated for that nearest neighbor corresponding information item;
obtain a representative error increase rate by performing statistical processing of a plurality of obtained error increase rates; and
estimate, on the basis of a distance from corresponding information item in a neighborhood of the further position and the representative error increase rate, the registration error at the further position.

3. The apparatus according to claim 1, wherein the instructions, when executed by the one or more processors, cause the one or more processors further to:
obtain, for a predetermined number of corresponding information items in a neighborhood of the further position, an error increase rate of each corresponding information on the basis of a distance from a nearest neighbor corresponding information item of each corresponding information item, and a registration error calculated for the nearest neighbor corresponding information item;

obtain a local representative error increase rate by performing statistical processing of a plurality of obtained error increase rates; and estimate, on the basis of a distance from a corresponding information item in a neighborhood of the further position and the local representative error increase rate, the registration error at the further position.

4. The apparatus according to claim 1, wherein the instructions, when executed by the one or more processors, cause the one or more processors further to:

obtain a deformed image by registering the first image to the second image on the basis of the plurality of corresponding information items; and control displaying to a display unit of the registration error superimposed on the deformed image.

5. The apparatus according to claim 4, wherein the instructions, when executed by the one or more processors, cause the one or more processors further to:

generate a registration error image by determining a value of each voxel or each pixel in the deformed image on the basis of the registration error of a position of the respective voxel or pixel, and superimpose the registration error image on the deformed image.

6. The apparatus according to claim 5, wherein a calculated registration error is a two-dimensional or three-dimensional error vector, and wherein the instructions, when executed by the one or more processors, cause the one or more processors further to:

estimate the registration error at the further position for each axial direction component on the basis of an error of each axial direction component of the two-dimensional or three-dimensional error vector, and generate the registration error image for each of the axial direction components.

7. The apparatus according to claim 4, wherein the instructions, when executed by the one or more processors, cause the one or more processors further to:

control displaying, by a numerical value, of a size of the registration error for a position designated on a display of the deformed image.

8. The apparatus according to claim 4, wherein the instructions, when executed by the one or more processors, cause the one or more processors further to:

control displaying of a graphic of a size corresponding to a size of the registration error for a position designated on a display of the deformed image at the designated position.

9. The apparatus according to claim 4, wherein the calculated registration error is a two-dimensional or three-dimensional error vector, and wherein the instructions, when executed by the one or more processors, cause the one or more processors further to:

estimate a registration error at the further position for each axial direction component on the basis of an error of each axial direction component of the two-dimensional or three-dimensional error vector; and control displaying, for a position designated on a display of the deformed image, of an ellipse, an axis of which is made to be a size of the registration error estimated in each of the axial direction components, making the designated position its center.

10. The apparatus according to claim 1, wherein the error increase rate of the registration error represents that the registration error increases as the distance from the position of the corresponding information item increases.

11. The apparatus according to claim 1, wherein the instructions, when executed by the one or more processors, cause the one or more processors further to:

obtain a plurality of error increase rates of the registration error corresponding to the plurality of corresponding information items;

obtain a representative error increase rate of the registration error by performing statistical processing of the plurality of error increase rates; and estimate, on the basis of the representative error increase rate and the distance between the further position and the position of corresponding information item and, the registration error at the further position.

12. An image processing apparatus, comprising:

one or more processors; and at least one memory coupled to the one or more processors, the at least one memory having instructions stored thereon which, when executed by the one or more processors, cause the one or more processors to:

obtain a plurality of corresponding information items of a first image and a second image of an object;

calculate first registration errors that occur at positions defined by the plurality of corresponding information items of the first image and the second image that are registered by performing a first registration process based on the plurality of corresponding information items;

calculate second registration errors that occur at the positions defined by the plurality of corresponding information items of the first image and the second image that are registered by performing a second registration process different from the first registration process based on the plurality of corresponding information items; and estimate a registration error that occurs at a further position different from the positions on the basis of the first registration errors at the positions and the second registration errors at the positions.

13. The apparatus according to claim 12, wherein the first registration process is a process for registration using corresponding information items remaining after excluding corresponding information item corresponding to the further position from the plurality of corresponding information items.

14. The apparatus according to claim 13, wherein the second registration process is a process for registration using the plurality of corresponding information items.

15. The apparatus according to claim 12, wherein the first registration errors are Target Registration Errors.

16. The apparatus according to claim 15, wherein the first registration errors are Fiducial Registration Errors.

17. The apparatus according to claim 12, wherein the instructions, when executed by the one or more processors, cause the one or more processors further to:

generate an interpolation field indicating an interpolated registration error by interpolating the first registration errors that occur at the positions;

generate a corrected interpolation field by correcting the interpolation field on the basis of the second registration errors that occur at the positions; and estimate the registration error at the further position from the corrected interpolation field.

18. The apparatus according to claim 17, wherein the instructions, when executed by the one or more processors, cause the one or more processors further to:
   correct the interpolation field by a correction field in which a correction amount at a position of each corresponding information item is a local maximum value.

19. The apparatus according to claim 17, wherein the instructions, when executed by the one or more processors, cause the one or more processors further to:
   correct the interpolation field so that the interpolated registration error at each position of the corresponding information items becomes a local minimum value.

20. The apparatus according to claim 17, wherein the instructions, when executed by the one or more processors, cause the one or more processors further to:
   correct the interpolation field so that the first registration errors at the positions correspond to the second registration errors at the positions.

21. The apparatus according to claim 17, wherein the instructions, when executed by the one or more processors, cause the one or more processors further to:
   correct the interpolation field such that the first registration error at a position of each corresponding information item of the interpolation field becomes zero.

22. An image processing apparatus, comprising:
   one or more processors; and
   at least one memory coupled to the one or more processors, the at least one memory having instructions stored thereon which, when executed by the one or more processors, cause the one or more processors to:
      obtain a plurality of corresponding information items of a first image and a second image of an object;
      calculate registration errors that occur at positions defined by the plurality of corresponding information items of the first image and the second image that are registered by performing a first registration process based on the plurality of corresponding information items; and
      generate an interpolation field indicating an interpolated registration error by interpolating the registration errors that occur at the positions;
      generate a corrected interpolation field by correcting the interpolation field such that the interpolated registration error increases as a distance from a position of each corresponding information item increases; and
      estimate the registration error at a further position different from the positions on the basis of the corrected interpolation field.

23. The apparatus according to claim 22, wherein the instructions, when executed by the one or more processors, cause the one or more processors further to:
   correct the interpolation field by a correction field in which a correction amount at a position of each corresponding information item is a local maximum value.

24. The apparatus according to claim 22, wherein the instructions, when executed by the one or more processors, cause the one or more processors further to:
   correct the interpolation field so that the interpolated registration error at each position of the corresponding information items becomes a local minimum value.

25. The apparatus according to claim 22, wherein the instructions, when executed by the one or more processors, cause the one or more processors further to:
   correct the interpolation field such that the interpolated registration error at a position of each corresponding information item of the interpolation field becomes zero.

* * * * *